(12) United States Patent
Ramaiah et al.

(10) Patent No.: US 12,450,325 B2
(45) Date of Patent: Oct. 21, 2025

(54) SYSTEM AND METHOD FOR HARDWARE COMPONENT VALIDATION FOR ONBOARDING

(71) Applicant: Dell Products L.P., Round Rock, TX (US)

(72) Inventors: Mahesh Babu Ramaiah, Bangalore (IN); Joseph Caisse, Burlington, MA (US); Bradley K. Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 18/299,912

(22) Filed: Apr. 13, 2023

(65) Prior Publication Data
US 2024/0346125 A1 Oct. 17, 2024

(51) Int. Cl.
G06F 21/33 (2013.01)
G06F 21/60 (2013.01)
G06F 21/64 (2013.01)

(52) U.S. Cl.
CPC ............ G06F 21/33 (2013.01); G06F 21/602 (2013.01); G06F 21/64 (2013.01)

(58) Field of Classification Search
CPC ......... G06F 21/33; G06F 21/602; G06F 21/64
See application file for complete search history.

(56) References Cited

U.S. PATENT DOCUMENTS

| | | | | |
|---|---|---|---|---|
| 11,629,996 | B2* | 4/2023 | Scherer | G01J 3/26 |
| | | | | 356/326 |
| 2011/0041003 | A1* | 2/2011 | Pattar | H04L 41/0681 |
| | | | | 714/E11.073 |
| 2013/0125097 | A1* | 5/2013 | Ebcioglu | G06F 8/4452 |
| | | | | 717/136 |
| 2016/0057012 | A1* | 2/2016 | Hilden | H04L 41/0853 |
| | | | | 709/224 |
| 2020/0143039 | A1* | 5/2020 | Chauvet | G06F 21/44 |
| 2020/0327231 | A1* | 10/2020 | Smith | G06F 21/33 |
| 2022/0053295 | A1* | 2/2022 | Ghourchian | G01S 13/765 |
| 2023/0353554 | A1* | 11/2023 | Behera | B60L 53/68 |
| 2024/0187258 | A1* | 6/2024 | Heilman | H04L 9/0825 |

* cited by examiner

Primary Examiner — Linglan Edwards
Assistant Examiner — Jacob Benedict Knackstedt
(74) Attorney, Agent, or Firm — WOMBLE BOND DICKINSON (US) LLP

(57) ABSTRACT

Methods and systems for verifying component loadouts are disclosed. During onboarding and after onboarding, the hardware component loadouts of endpoint devices may be checked to identify whether component drift has occurred. The checks may be performed by comparing actual loadouts to expected loadouts. The expected loadouts may be identified using loadout established when an endpoint device is manufactured, as well as authorized changes in the loadouts that may be made by various owners. The initial loadout and authorized changes may be documented usings cryptographically verifiable data structures that form chains back to a root of trust.

20 Claims, 8 Drawing Sheets

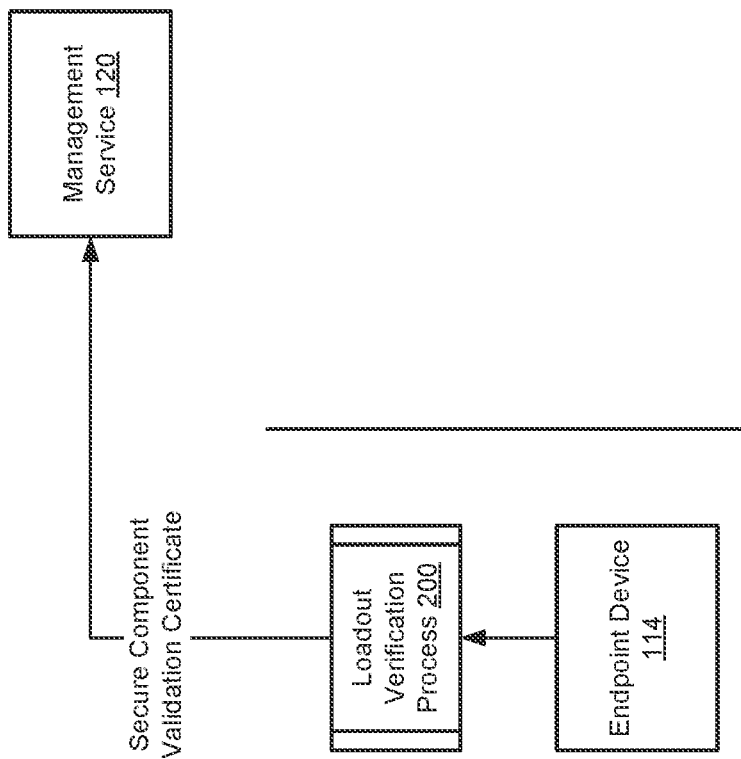

SYSTEM AND METHOD FOR HARDWARE COMPONENT VALIDATION FOR ONBOARDING

FIELD

Embodiments disclosed herein relate generally to component validation. More particularly, embodiments disclosed herein relate to systems and methods to verify whether actual component loadouts meet expected component loadouts.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show data flow diagrams in accordance with an embodiment. a

DETAILED DESCRIPTION

Figure 1:
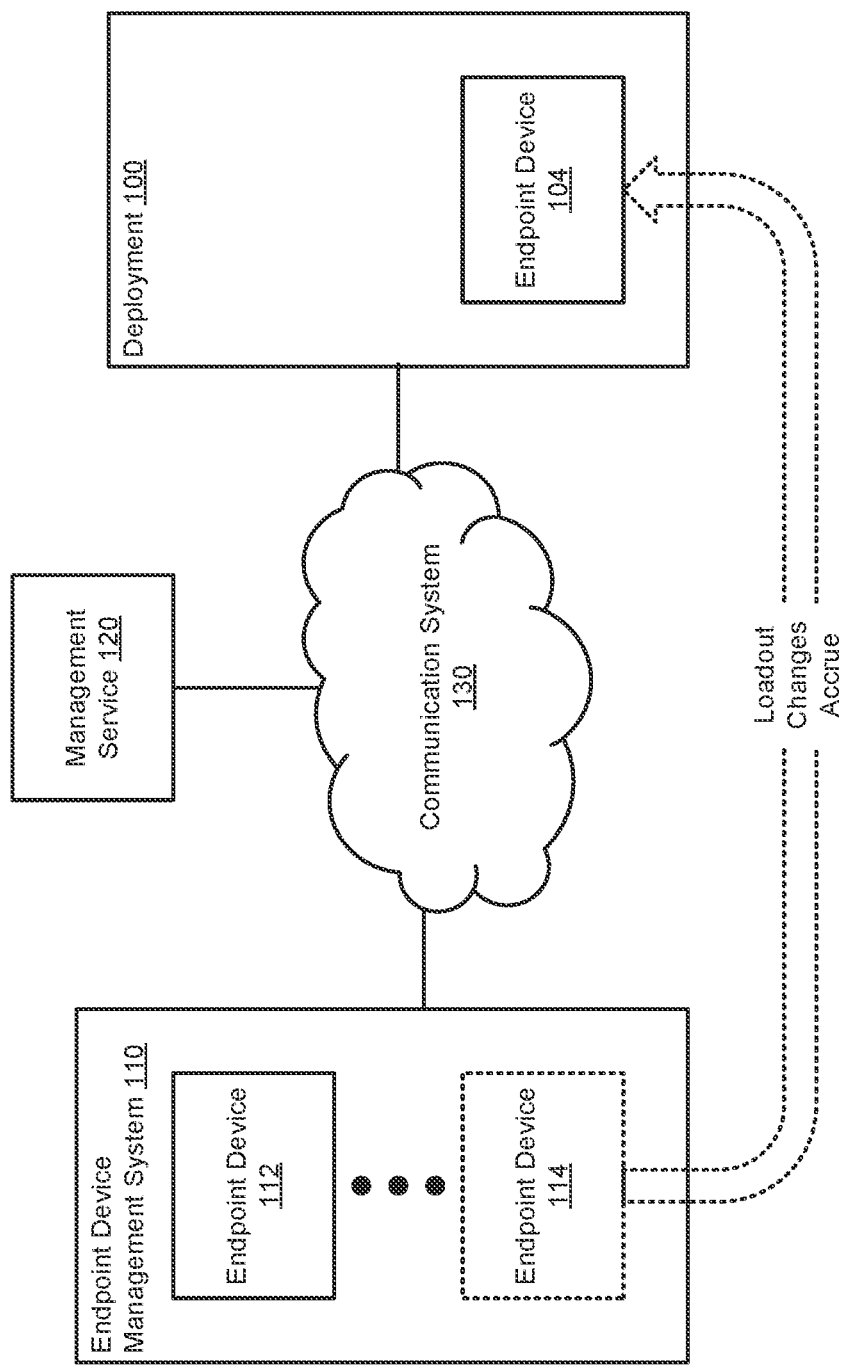
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using endpoint devices. To provide the computer implemented services, endpoint devices may join deployments through onboarding processes. During onboarding, an endpoint device may be modified to facilitate cooperative operation with other endpoints of the deployment.

During onboarding, component drift for the endpoints may be identified. If component drift is identified, additional remedial actions may be performed because components drift may indicate one or more issues impacting the endpoint devices.

To identify whether component drift has occurred, an actual hardware component loadout of the endpoint device may be compared to an expected hardware loadout. A difference may indicate that component drift has occurred.

To identify the expected loadout for the endpoint device, an initial component loadout (e.g., at manufacturing) and authorized changes in the loadout while under various owners may be taken into account to identify the expected hardware component loadout. The initial loadout and authorized changes may be documented using cryptographically verifiable data structures. Changes in ownership may also be tracked using cryptographically verifiable data structures.

When an endpoint device is onboarded, the cryptographically verifiable data structures may be obtained (e.g., as part of an ownership voucher obtained during onboarding) and used to resolve the expected hardware component loadout for the endpoint device. For example, ownership (and an initial loadout is established) in an endpoint device may change over time after being manufactured. While under different ownership, hardware components of the endpoint devices may change due to, for example, replacement, addition, removal, etc. As these changes are made, certificates (e.g., delta certificates) may be generated documenting that these changes are authorized changes by the owner of the endpoint device at the time the change is made. The certificates may form a verifiable chain to a root of trust for the endpoint device.

By establishing an expected loadout based on both an initiation loadout and authorized changes over time, embodiments disclosed herein may provide endpoint devices that may be less likely to fail component checks due to differences in actual and expected loadouts. Consequently, the endpoint devices may be more likely to be able to join and operate as part of deployments more quickly. Thus, embodiments disclosed herein may address, among others, the technical problem of limited computing resources by more efficiently marshaling limited computing resources. The disclosed embodiments may do so by more accurately identifying expectations in loadout such that endpoint devices are less likely to fail component validation checks.

In an embodiment, a method for managing component validation for an endpoint device is disclosed. The method may include, during an onboarding of the endpoint device to a deployment: obtaining an ownership voucher for the endpoint device; verifying authenticity of certificates in the ownership voucher to obtain authenticated certificates; obtaining an expected loadout of hardware components for the endpoint device using a secure component validation certificate of the authenticated certificates and at least one delta certificate of the authenticated certificates; obtaining an actual loadout of hardware components of the endpoint device; making a determination regarding whether the actual loadout matches the expected loadout; in a first instance of the determination where the actual loadout matches the expected loadout: completing the onboarding of the endpoint device; and in a second instance of the determination where the actual loadout does not match the expected loadout: performing an action set to manage component drift of the endpoint device.

Completing the onboarding may include identifying first software based on the expected loadout; and instantiating an instance of the first software on the endpoint device.

The first software may be incompatible with the component drift of the endpoint device.

Performing the action set may include initiating performance of a change in the hardware component of the endpoint device to match an updated actual loadout to the expected loadout.

Performing the action set may include identifying second software based on the actual loadout; and instantiating an instance of the second software on the endpoint device.

The certificates may include a first portion of certificates that indicates changes in ownership of the endpoint device over a period of time, the first portion of the certificates forming a cryptographically verifiable chain of changes in ownership to a root of trust for the endpoint device.

The delta certificates may indicate changes in loadout of the endpoint device while under various ownership, the delta certificates forming a second cryptographically verifiable chain of changes in the loadout to the root of trust for the endpoint device.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include deployment 100. Deployment 100 may be operated by an entity (e.g., a business) and include any number of endpoint devices.

Each of the endpoint devices may have a limited capacity for providing computer implemented services. Additionally, overtime the quantity and/or type of computer implemented services desired by the entity may change. Consequently, the capacity of deployment 100 to provide computer implemented services may become insufficient.

To change the capacity of deployment 100, additional data processing systems may be added to deployment 100. For example, the entity may contract with a seller of endpoint devices to have and endpoint devices (e.g., 114) added to deployment 100.

To add an endpoint device to deployment 100, an onboarding process may be performed. During the onboarding process, the endpoint devices may be configured to operate in accordance with expectations of endpoint devices of deployment 100. The onboarding process may include, for example, (i) deploying software to the endpoint device, (ii) configuring various settings of the endpoint device for operation, and/or other changes to the endpoint device may be made to prepare the endpoint device for cooperative operation with other devices of deployment 100.

However, the onboarding process may expect that the endpoint device include certain hardware (e.g., a loadout) and not include other types of hardware. For example, during contracting with the seller the entity may set expectations with respect to the hardware to be included in the endpoint device. If a difference between the expected hardware (e.g., an expected loadout) and the actual hardware is present, then various issues may arise. For example, this type of difference may indicate that the endpoint device may have been tampered with by a malicious party, the endpoint device may be damaged, a received endpoint device is not the endpoint device that will satisfy the contract (e.g., devices may have been inadvertently switched), etc.

If such issues arise, onboarding and/or use of the endpoint device may be delayed. For example, the entity operating deployment 100 may delay integration with and/or operation in deployment 100 until a reason for the difference can be discerned. Accordingly, undesired delays in use of endpoint devices may occur thereby reducing the available resources of deployment 100. Consequently, various computing implemented services provided by deployment 100 may be at least temporarily unavailable.

In general, embodiments disclosed herein may provide methods, systems, and/or devices for improving the availability of endpoint devices. To improve the availability of endpoint devices, the system of FIG. 1 may granularly track authorized changes in the loadout of endpoint devices prior to, during, and after the endpoint devices are added to deployment 100. The authorized changes in the loadout may be tracked to ensure that an expected loadout for the endpoint device is kept up to date. By ensuring that the expected loadout is kept up to date, the actual loadout as identified when the endpoint device may be less likely to differ from the expected loadout. Consequently, component validations for the endpoint device may be more likely to be passed thereby avoiding various delays due to, for example, additional validations for the endpoint device prior to full use in deployment 100.

To provide the above noted functionality, the system of FIG. 1 may include deployment 100, endpoint device management system 110, and management service 120. Each of these components is discussed below.

Deployment 100, as noted above, may provide computer implemented services using any number of endpoint devices. To do so, deployment 100 may (i) onboard endpoint devices, (ii) use the onboarded endpoint devices to provide the computer implemented services, and (iii) perform additional verifications of the onboarded endpoint devices overtime (e.g., to ensure that the endpoint devices continue to be in condition to cooperatively operate as part of deployment 100).

During onboarding of endpoint devices, an onboarding service of deployment 100 may ascertain an expected loadout for and an action loadout of a to-be-onboarded endpoint device. The expected loadout and actual loadout may be compared to identify whether any differences exist. If differences exist, then the onboarding service may take some action to identify whether the difference will preclude continued onboarding of the to-be-onboarded endpoint device (e.g., based on criteria). The onboarding service may then take corresponding action which may delay or prevent the endpoint device from contributing the computer implemented services provided by deployment 100 until the differences are resolved and/or otherwise addressed.

Once onboarded, verification processes may be performed for the endpoint devices. For example, at boot, similar comparisons between the expected and actual loadout of the endpoint devices may be performed. Similarly, various actions (e.g., suspending operation of the endpoint devices, etc.) may be taken if differences exist.

Figure 2B:
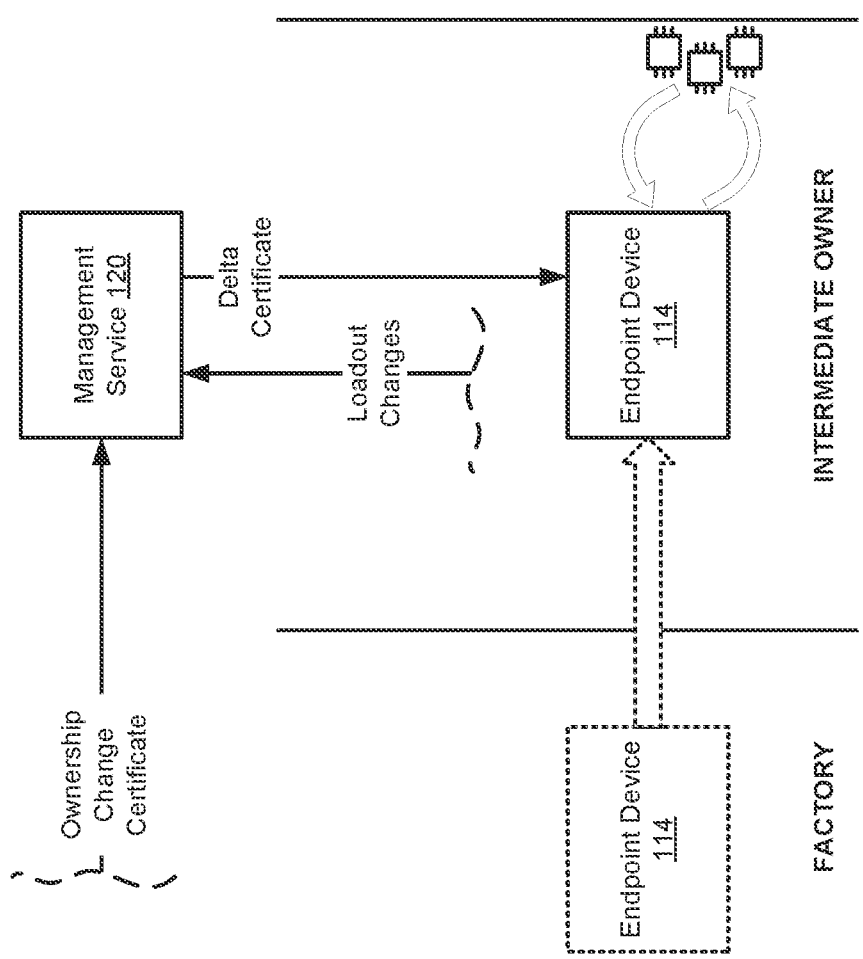
Figure 2C:
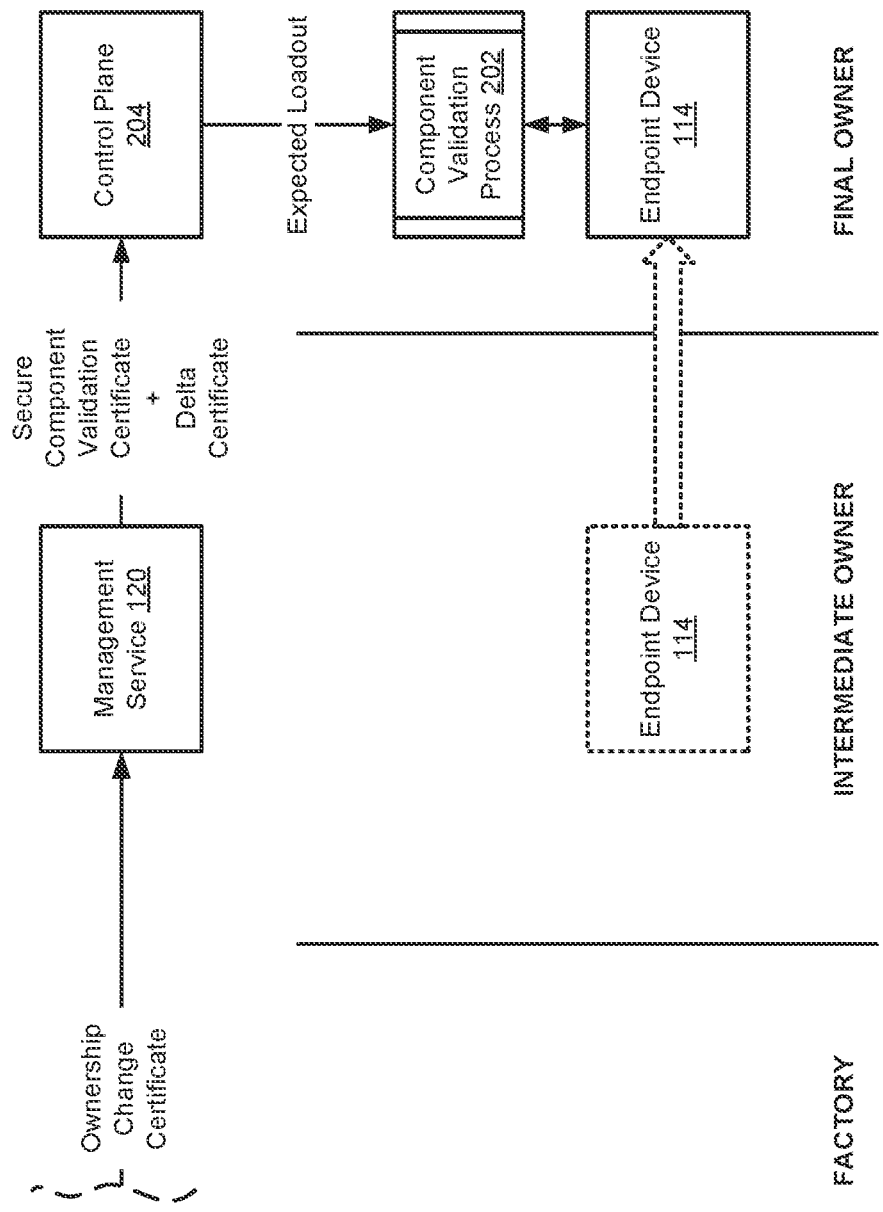
Figure 2D:
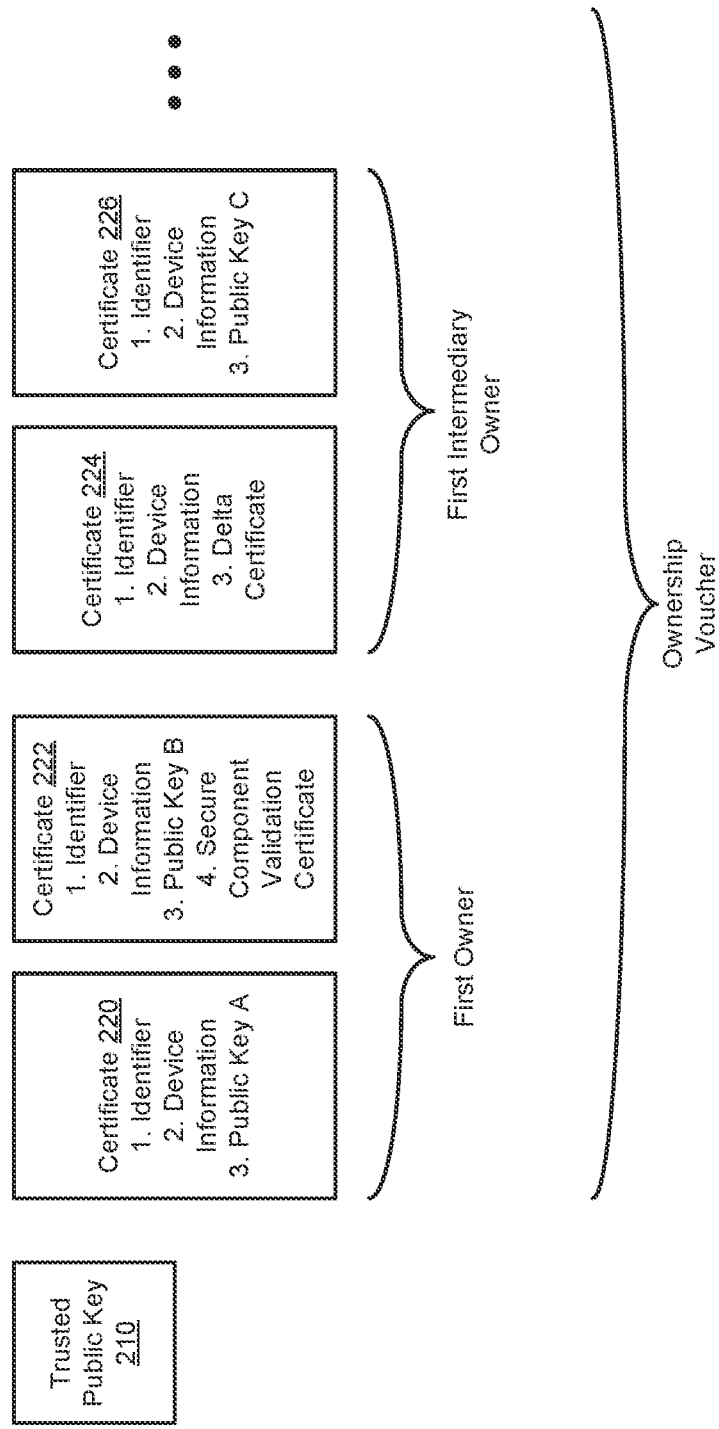
FIG. 2D shows a diagram of a data structure in accordance with an embodiment.
Figure 2E:
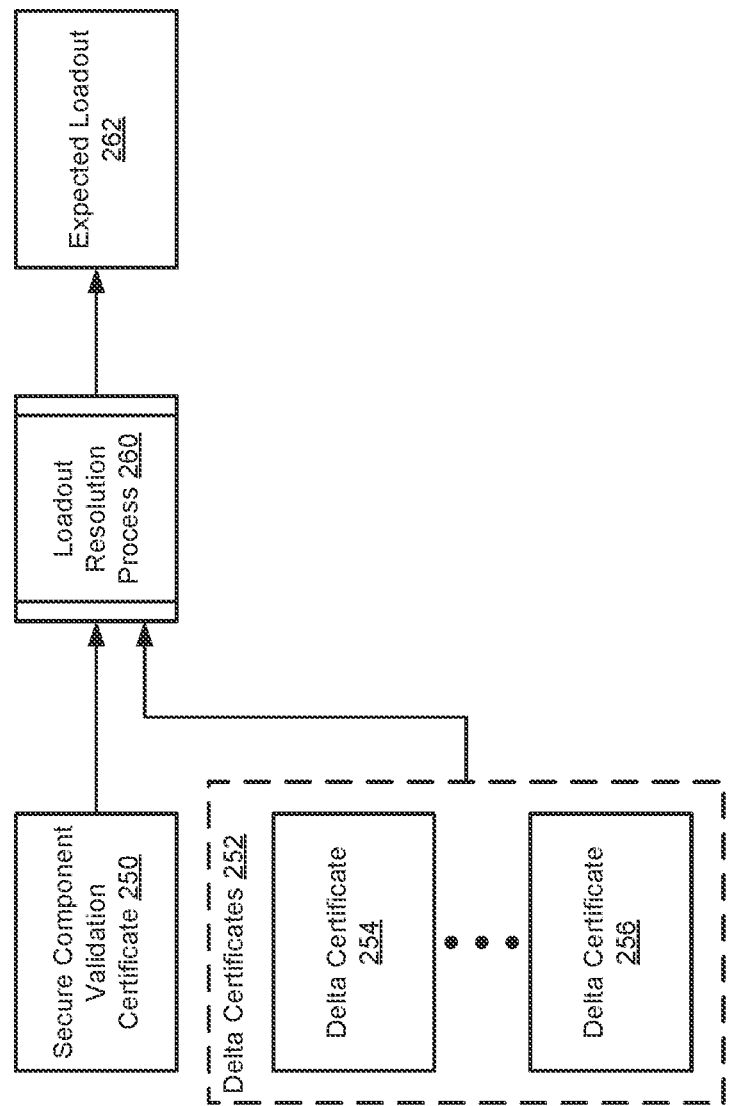
FIG. 2E shows a data flow diagram in accordance with an embodiment.

To ascertain the expected loadout for an endpoint device, the onboarding service may utilize cryptographically verifiable data structures (e.g., an onboarding voucher and certificates documenting changes in ownership and/or authorized changes in hardware components). The cryptographically verifiable data structures may be obtained from management service 120 and/or other sources. Refer to FIGS. 2A-2C for additional details regarding onboarding. Refer to FIG. 2D for additional details regarding cryptographically verifiable data structures. Refer to FIG. 2E for additional details regarding identifying an expected loadout using cryptographically verifiable data structures.

Endpoint device management system 110 may facilitate (i) acquisition of new endpoint devices (112-114) for use in deployment 100, and (ii) generation of some of the cryptographically verifiable data structures.

To facilitate acquisition of new endpoint devices, endpoint device management system 110 may implement a portal or other interface through which agents of various entities may enter contractual relationships for adding endpoint devices to various deployments. When used by the agents, information regarding the future owner of one of endpoint devices 112-114 and/or a desired hardware loadout may be obtained. Once obtained, an endpoint device (e.g., 112, 114) may be selected or an endpoint device (not shown) that has already been transferred to another entity (e.g., a reseller) may be selected.

For endpoint devices that have not already been transferred to ownership by another entity, the selected endpoint device may be configured for deployment by (i) establishing a root of trust (e.g., a public key) for endpoint device, (ii) performing a component validation process to identify the actual hardware loadout, (iii) using the actual hardware loadout to obtain a cryptographically verifiable data structure (e.g., a secure component validation certificate which may be used by deployment 100 to identify and expected hardware loadout), and/or (iv) transferring ownership to the contracting entity using a cryptographically verifiable data structure (e.g., a signed certificate document the change in ownership from one entity to another entity).

For endpoint devices that have already been transferred to ownership by another entity, only the change in ownership may be documented using a cryptographically verifiable data structure (e.g., a signed certificate document the change in ownership from one entity to another entity). Roots of trust, component validation processes, and other processes may have already been completed.

However, for endpoint devices that have already been transferred to ownership by another entity, various changes in the actual hardware loadout may have been made by the new owners. For example, a reseller may modify the component inventory to add or remove functionality, to replace hardware components that have failed, and/or otherwise modified the component inventory for other reasons. In FIG. 1, an example of such challenges is graphically illustrated with the oversized arrow drawn in dashing extending from endpoint device 114 drawn in dashing on the left of the page to endpoint device 104 on the right of the page. Endpoint device 114 is drawn in dashing to indicate that it was once part of endpoint device management system 110 but has now been transferred to deployment 100 as endpoint device 104.

The oversized arrow indicates that the endpoint device may have been owned by any number of intermediary entities which may have modified its hardware loadout. Consequently, any number of loadout changes may have accrued which, if not accounted for as having been authorized by previous owners, may cause endpoint device 104 to fail component validation processes performed during onboarding to deployment 100.

As these changes to the hardware inventory of an endpoint device are made, the changes may be documented using cryptographically verifiable data structures established by management service 120. The changes in hardware inventory may be resolved as being authorized or unauthorized based on the cryptographically verifiable ownership over an endpoint device, as will be discussed in greater detail below. Refer to FIG. 2B for additional details regarding establishing cryptographically verifiable changes in ownership and authorized changes in hardware loadout based on ownership.

Management service 120 may (i) cryptographically document changes in ownership over endpoint devices, (ii) cryptographically document changes in authorized hardware loadout for endpoint devices, and (iii) provide onboarding services of deployment 100 and/or other entities with cryptographically verifiable data structures indicating the changes in ownership, authorized hardware loadout, and/or other information for endpoint devices. To do so, management service 120 may obtain information regarding changes in hardware loadout for endpoint devices, validate that the changes are authorized based on ownership of the endpoint devices, issue cryptographically verifiable data structures (e.g., delta certificates) documenting authorized changes in hardware loadouts of endpoint devices, obtain consolidated cryptographically verifiable data structures (e.g., ownership vouchers) based on other cryptographically verifiable data structures, and distribute cryptographically verifiable data structures to other entities.

Figure 3:
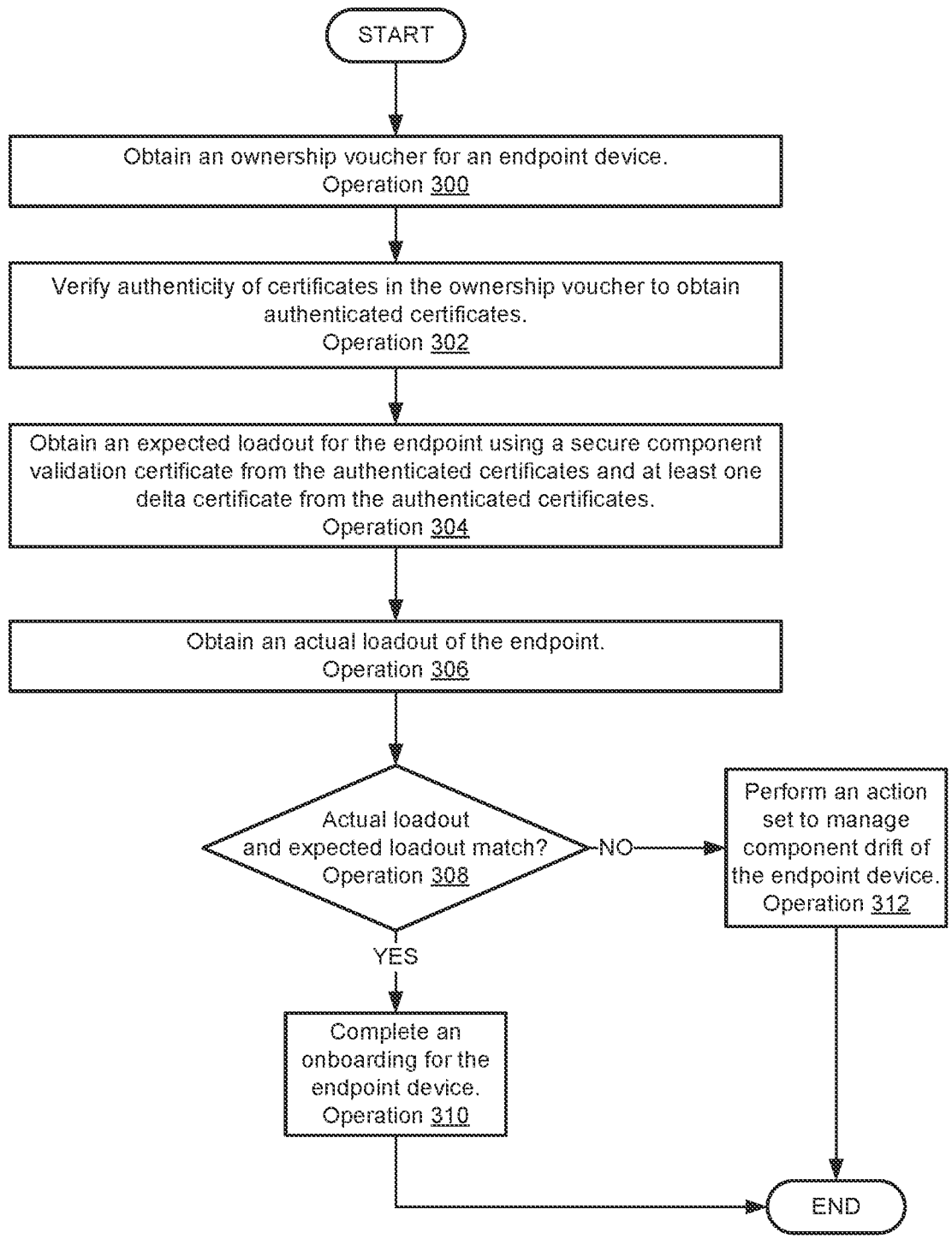
FIG. 3 shows a flow diagram illustrating a method in accordance with an embodiment.

When providing their functionality, any of (and/or components thereof) deployment 100, endpoint device management system 110, and/or management service 120 perform all, or a portion, of the method illustrated in FIG. 3.

Any of (and/or components thereof) deployment 100, endpoint device management system 110, and/or management service 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, hardware components of endpoint devices may be modified over time. To track authorized changes, management service 120 may issue delta certificates. FIGS. 2A-2C show diagrams of example data flows that may occur over time as ownership of endpoint device 104 changes in accordance with an embodiment.

Turning to FIG. 2A, a first data flow diagram in accordance with an embodiment is shown. In FIG. 2A, the page is divided into different regions corresponding to periods of time when endpoint device 114 is owned and/or located at a factory, with an intermediate owner, and with a final owner. The factory may house endpoint device management system 110 and/or other components shown in FIG. 1. Similar diagrams are shown in FIGS. 2B-2C, but illustrate different period of time.

When endpoint device 114 is positioned at the factory, an initial root of trust may be established by embedding a public key in endpoint device 114. The endpoint device may be for the root of trust for endpoint device 114. Consequently, endpoint device 114 may use the public key to establish whether statements regarding authority, changes in ownership, changes in hardware, etc. are valid.

While at the factory, loadout verification process 200 may be performed to obtain a secure component validation certificate for endpoint device 114. Loadout verification process 200 may identify the hardware components present in endpoint device 114 prior to changing ownership of endpoint device 114 to other entities. The secure component validation certificate may be signed using the private key corresponding to the public key of the root of trust. In this example, the root of trust may be the manufacturer of endpoint device 114.

Additionally, while not shown, a certificate establishing ownership by of endpoint device 114 by the manufacturer may be established. For example, the certificate may include a globally unique identifier (GUID), a description of endpoint device 114, and a copy of the public key of the root of trust. Like the secure component validation certificate, the change in ownership certificate may be signed using the private key corresponding to the public key for the root of trust. These certificates may be provided to management service 120.

Turning to FIG. 2B, a second data flow diagram in accordance with an embodiment is shown. In FIG. 2B, boxes representing endpoint device 114 are shown. The first to the left is drawn in dashing to indicate that endpoint device 114 has been moved from the factory to another location where and intermediate owner has taken possession of endpoint device 114. The oversized arrow drawn with dashed outline is included to indicate the same change in location.

Continuing with the example from FIG. 2A, now consider an example scenario where the intermediate owner contracts with the factory to take ownership of endpoint device 114. To do so, the factory may generate an ownership change certificate that includes the GUID, description of endpoint device 114, and a public key of the intermediate owner. The ownership change certificate may be signed with the private key corresponding to the public key of the root of trust (e.g., the factory in this example).

After taking possession of endpoint device 114, the intermediate owner may modify the hardware components of endpoint device 114. To ensure that the change in loadout is tracked, loadout changes signed with the private key (or at least including a signed certificate with the changes) of the intermediate owner may be provided to management service 120. The management service may verify that endpoint device 114 was owned by the intermediate owner when the loadout changes are received using the ownership change certificate, and may generate a delta certificate. The delta certificate may specify the changes to the loadout of endpoint device 114, and may be signed using a trusted key (e.g., the private key corresponding to the public key of the root of trust, or an entity with authority to generate delta certificates delegated by the root of trust).

The ownership change certificate and delta certificate may be added to or used to update an ownership voucher. Refer to FIG. 2D for additional details regarding changing ownership vouchers.

The process depicted in FIG. 2B may be repeated for any number of intermediate owners, and changes in loadout of endpoint device 114. Consequently, the resulting ownership voucher may include information based on any number of changes in ownership and changes in hardware loadout.

Turning to FIG. 2C, a third data flow diagram in accordance with an embodiment is shown. In FIG. 2C, boxes representing endpoint device 114 are shown. The first box to the left in FIG. 2C is drawn in dashing to indicate that endpoint device 114 has been moved from the intermediate owner to another location where and a final owner has taken possession of endpoint device 114. The oversized arrow drawn with dashed outline is included to indicate the same change in location.

Continuing with the example from FIG. 2B, now consider an example scenario where the final owner contracts with the intermediate owner to take ownership of endpoint device 114. To do so, the intermediate owner may generate an ownership change certificate that includes the GUID, description of endpoint device 114, and a public key of the final owner. The ownership change certificate may be signed with the private key corresponding to the public key of the intermediate owner.

After taking possession of endpoint device 114, the final owner may wish to onboard endpoint device 114. During the onboarding, component validation process 202 may be performed. During the process, the actual hardware loadout of endpoint device 114 may be compared to an expected hardware loadout of endpoint device 114. To make the comparison, control plane 204 of deployment 100 may obtain an ownership voucher from management service 120. The ownership voucher may be cryptographically verifiable and include the secure component validation certificate established by the factory and any number of delta certificates (and/or verifiable information based on these certificates). These certificates may be used to resolve the expected hardware loadout. Consequently, the expected hardware loadout used in component validation process 202 may take into account authorized changes made to the hardware loadout by any number of intermediary owners of endpoint device 114. Refer to FIG. 2D for additional details regarding ownership vouchers, and FIG. 2E for additional details regarding an expected hardware component loadout for endpoint device 114.

Turning to FIG. 2D, a diagram an example ownership voucher in accordance with an embodiment is shown.

As seen in FIG. 2D, the ownership voucher may include and/or be based on any number of certificates 220-226. The certificates may be verifiable back to trusted public key 210 which may be established at the factory and may serve as identifying the root of trust for an endpoint device.

The certificates may include any number of certificates (e.g., 220, 222, 226) that establish chain of changes in ownership, and/or any number of certificates (e.g., 222, 224) that establish an initiate hardware loadout and authorized changes to the hardware loadout made by various owners.

For example, each of certificate document a change in ownership may include (i) an identifier (e.g., GUID) for the endpoint device, (ii) device information for the endpoint device, and (iii) a public key. Each certificate may be signed by a current owner, and the included public key may indicate the new owner. For example, certificate 220 may include public key A (e.g., of first owner) and may be signed by trusted public key 210 (which may be the pair for public key A). In contrast, certificate 222 may include public key B (e.g., of first intermediary owner) and may be signed using a private key for public key A. Consequently, certificate 222 may document the transfer of ownership by virtue of the inclusion of public key B.

Some certificates may also document (i) initial component loadouts and (ii) authorized changes in loadout. For example, certificate 222 may also include a secure component validation certificate which may establish the initial hardware loadout. In contrast, certificate 224 may include a delta certificate specifying authorized changes in the hardware loadout. Thus, the combination of the secure component validation certificate and the delta certificate may establish an expected loadout of the endpoint device.

For example, consider a scenario where a secure component validation certificate specifies presence of a processor, a memory module, and a first graphics processing card. Additionally, a delta certificate may specify removal of the first graphics processing card and addition of a second graphics processing card. These certificates may establish that the removal of the first graphics processing card and addition of the second graphics processing card are both authorized. Consequently, the expected hardware loadout for the endpoint device may include the processor, the memory module, and the second graphics processing unit.

Turning to FIG. 2E, a fourth data flow diagram in accordance with an embodiment is shown. To resolve expected loadout 262, secure component validation certificate 250 and any number of delta certificates 252 may be ingested by loadout resolution process 260. During loadout resolution process 260, the changes specifies by each delta certificate (e.g., 254-256) may be applied to the base hardware loadout specified by secure component validation certificate 250 to obtain expected loadout 262.

The secure component validation certificate 250 and delta certificates may be cryptographically verifiable back to the source of trust for an endpoint device.

As discussed above, the components of FIG. 1 may perform various methods to facilitate onboarding and continued validation of endpoint devices during operation. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for hardware component drift of an endpoint device in accordance with an embodiment is shown. The method may be performed by any of deployment 100, endpoint device management system 110, management service 120, and/or other components of the system shown in FIG. 1.

At operation 300, an ownership voucher for an endpoint device is obtained. The ownership voucher may be obtained by a control plane of a deployment. The control plane of the deployment may obtain the ownership voucher from a management service trusted by the control plane. The control plane may obtain the ownership voucher as part of a transaction involving the endpoint device.

The control plane may obtain the ownership voucher, in part, to perform an onboarding for the endpoint device. The other operations of FIG. 3 may also be performed as part of an onboarding of the endpoint device.

At operation 302, authenticity of certificates in the ownership voucher are verified to obtain authenticated certificates. The certificates may be authenticated by establishing chains of certificates that (i) are cryptographically verifiable, and (ii) establish chains to a root of trust. The certificates may include ownership transfer certificates, secure component validation certificates, delta certificates, and/or other types of certificates. Certificates that cannot be chained to the root of authority may be treated as being inauthentic.

At operation 304, an expected loadout for the endpoint is obtained using a secure component validation certificate of the authenticated certificates and at least one delta certificate from the authenticated certificates. The expected loadout may be obtained by resolving the certificates as described with respect to FIG. 2E.

At operation 306, an actual loadout of the endpoint is obtained. The actual loadout may be obtained by inventorying the hardware components of the endpoint.

At operation 308, a determination is made regarding whether the expected loadout matches the actual loadout. If the actual loadout matches the expected loadout, then the method may proceed to operation 310. Otherwise the method may proceed to operation 312.

At operation 310, an onboarding for the endpoint is completed. The onboarding may be completed by, for example, installing software on the endpoint device, modifying configurations, and/or performing other operations to place the endpoint device into compliance with one or more requirements for joining a deployment. The method may end following operation 310.

Returning to operation 308, the method may proceed to operation 312 if there is a difference between the actual loadout and the expected loadout.

At operation 312, an action set to manage component drift of the endpoint device is performed. Component drift may occur when unauthorized changes to the components of an endpoint device have been made. The action set may include one or more of (i) notifying an administrator, (ii) initiating modification to hardware of the endpoint device, (iii) disabling and/or enabling hardware of the endpoint device, (iv) selecting a different portion of software to install on the endpoint device based on the difference, (v) completing the onboarding, and/or other actions that may lead the endpoint device to being in condition for joining a deployment.

The method may end following operation 312.

Once onboarded, similar checks on the actual loadout and expected loadout may be performed over time. For example, similar checks may be performed during certain boots of the endpoint device.

Using the method illustrated in FIG. 3, embodiments disclosed herein may improve the availability of endpoint devices by reducing the likelihood of the endpoint devices failing loadout checks. By taking into account authorized change in loadout made prior to onboarding, the endpoint devices may be provided with an up to date expectation regarding what their hardware loadout should be. Accordingly, loadout checks may be less likely to be failed when, in reality, the endpoint devices have not actually suffered component drift.

Figure 4:
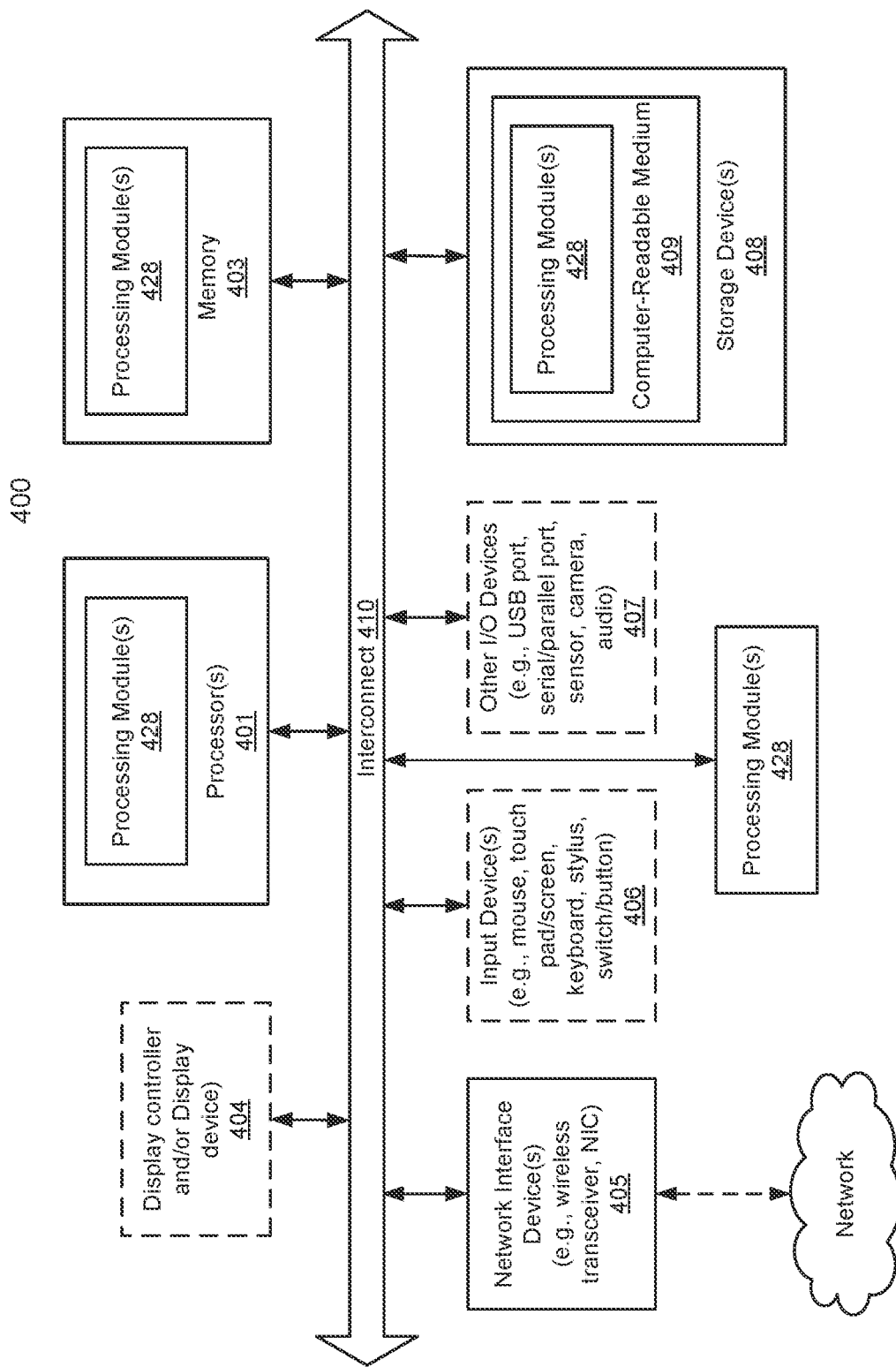
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing component validation for an endpoint device, the method comprising:
  during an onboarding of the endpoint device to a deployment:
    obtaining an ownership voucher for the endpoint device;
    verifying authenticity of certificates in the ownership voucher to obtain authenticated certificates by determining whether each of the certificates can be chained back through one or more of other ones of the certificates to a root of trust for the endpoint device, wherein only certificates among the certificates that can be chained back to the root of trust are obtained as the authenticated certificates;
    obtaining an expected loadout of hardware components for the endpoint device using a secure component validation certificate of the authenticated certificates and at least one delta certificate of the authenticated certificates, wherein the at least one delta certificate specifies authorized changes to a loadout of the hardware components of the endpoint device performed by a first entity while the endpoint device is under ownership of the first entity, and the authorized changes to the loadout of the hardware components of the endpoint device are authorized by a second entity that had ownership of the endpoint device before the first entity;

obtaining an actual loadout of the hardware components of the endpoint device;

making a determination regarding whether the actual loadout matches the expected loadout;

in a first instance of the determination where the actual loadout matches the expected loadout:
completing the onboarding of the endpoint device; and in a second instance of the determination where the actual loadout does not match the expected loadout:
performing an action set to manage component drift of the endpoint device.

2. The method of claim 1, wherein completing the onboarding comprises:
identifying a first software based on the expected loadout; and
instantiating an instance of the first software on the endpoint device.

3. The method of claim 2, wherein the first software is incompatible with the component drift of the endpoint device.

4. The method of claim 3, wherein performing the action set comprises:
initiating performance of a change in the hardware components of the endpoint device to match an updated actual loadout to the expected loadout.

5. The method of claim 3, wherein performing the action set comprises:
identifying second software based on the actual loadout; and
instantiating an instance of the second software on the endpoint device.

6. The method of claim 1, wherein the certificates comprise a first portion of certificates that indicates changes in ownership of the endpoint device over a period of time, the first portion of the certificates forming a cryptographically verifiable chain of changes in ownership to the root of trust for the endpoint device.

7. The method of claim 1, wherein transfer of ownership of the endpoint device from the second entity to the first entity is indicated in a first certificate of the certificates through inclusion of a public cryptographic key, of a cryptographic key pair, of the first entity in the first certificate.

8. A non-transitory machine-readable medium having instructions stored therein, which when executed by a processor, cause the processor to perform operations for managing component validation for an endpoint device, the operations comprising:

during an onboarding of the endpoint device to a deployment:
obtaining an ownership voucher for the endpoint device;
verifying authenticity of certificates in the ownership voucher to obtain authenticated certificates by determining whether each of the certificates can be chained back through one or more of other ones of the certificates to a root of trust for the endpoint device, wherein only certificates among the certificates that can be chained back to the root of trust are obtained as the authenticated certificates;

obtaining an expected loadout of hardware components for the endpoint device using a secure component validation certificate of the authenticated certificates and at least one delta certificate of the authenticated certificates, wherein the at least one delta certificate specifies authorized changes to a loadout of the hardware components of the endpoint device performed by a first entity while the endpoint device is under ownership of the first entity, and the authorized changes to the loadout of the hardware components of the endpoint device are authorized by a second entity that had ownership of the endpoint device before the first entity;

obtaining an actual loadout of hardware components of the endpoint device;

making a determination regarding whether the actual loadout matches the expected loadout;

in a first instance of the determination where the actual loadout matches the expected loadout:
completing the onboarding of the endpoint device; and in a second instance of the determination where the actual loadout does not match the expected loadout:
performing an action set to manage component drift of the endpoint device.

9. The non-transitory machine-readable medium of claim 8, wherein completing the onboarding comprises:
identifying a first software based on the expected loadout; and
instantiating an instance of the first software on the endpoint device.

10. The non-transitory machine-readable medium of claim 9, wherein the first software is incompatible with the component drift of the endpoint device.

11. The non-transitory machine-readable medium of claim 10, wherein performing the action set comprises:
initiating performance of a change in the hardware components of the endpoint device to match an updated actual loadout to the expected loadout.

12. The non-transitory machine-readable medium of claim 10, wherein performing the action set comprises:
identifying second software based on the actual loadout; and
instantiating an instance of the second software on the endpoint device.

13. The non-transitory machine-readable medium of claim 8, wherein the certificates comprise a first portion of certificates that indicates changes in ownership of the endpoint device over a period of time, the first portion of the certificates forming a cryptographically verifiable chain of changes in ownership to a root of trust for the endpoint device.

14. A data processing system, comprising:
a processor; and
a memory coupled to the processor to store instructions, which when executed by the processor, cause the processor to perform operations for managing component validation for an endpoint device, the operations comprising:

during an onboarding of the endpoint device to a deployment:
obtaining an ownership voucher for the endpoint device;
verifying authenticity of certificates in the ownership voucher to obtain authenticated certificates by determining whether each of the certificates can be chained back through one or more of other ones of the certificates to a root of trust for the endpoint device, wherein only certificates among the certificates that can be chained back to the root of trust are obtained as the authenticated certificates;

obtaining an expected loadout of hardware components for the endpoint device using a secure component validation certificate of the authenticated certificates and at least one delta certificate of the authenticated certificates, wherein the at least one delta certificate specifies authorized changes to a loadout of the hardware components of the endpoint device performed by a first entity while the endpoint device is under ownership of the first entity, and the authorized changes to the loadout of the hardware components of the endpoint device are authorized by a second entity that had ownership of the endpoint device before the first entity;

obtaining an actual loadout of hardware components of the endpoint device;

making a determination regarding whether the actual loadout matches the expected loadout;

in a first instance of the determination where the actual loadout matches the expected loadout:
completing the onboarding of the endpoint device; and in a second instance of the determination where the actual loadout does not match the expected loadout:
performing an action set to manage component drift of the endpoint device.

15. The data processing system of claim 14, wherein completing the onboarding comprises:
identifying a first software based on the expected loadout; and
instantiating an instance of the first software on the endpoint device.

16. The data processing system of claim 15, wherein the first software is incompatible with the component drift of the endpoint device.

17. The data processing system of claim 16, wherein performing the action set comprises:
initiating performance of a change in the hardware components of the endpoint device to match an updated actual loadout to the expected loadout.

18. The data processing system of claim 16, wherein performing the action set comprises:
identifying second software based on the actual loadout; and
instantiating an instance of the second software on the endpoint device.

19. The data processing system of claim 14, wherein the certificates comprise a first portion of certificates that indicates changes in ownership of the endpoint device over a period of time, the first portion of the certificates forming a cryptographically verifiable chain of changes in ownership to a root of trust for the endpoint device.

20. The data processing system of claim 14, wherein transfer of ownership of the endpoint device from the second entity to the first entity is indicated in a first certificate of the certificates through inclusion of a public cryptographic key, of a cryptographic key pair, of the first entity in the first certificate.

* * * * *